(12) United States Patent
Park et al.

(10) Patent No.: US 10,203,891 B2
(45) Date of Patent: Feb. 12, 2019

(54) DATA STORAGE DEVICE AND DATA PROCESSING SYSTEM

(71) Applicant: SK hynix Inc., Gyeonggi-do (KR)

(72) Inventors: Jeen Park, Gyeonggi-do (KR); Ki Won Lee, Gyeonggi-do (KR)

(73) Assignee: SK Hynix Inc., Gyeonggi-do (KR)

(*) Notice: Subject to any disclaimer, the term of this patent is extended or adjusted under 35 U.S.C. 154(b) by 155 days.

(21) Appl. No.: 15/463,087

(22) Filed: Mar. 20, 2017

(65) Prior Publication Data

US 2018/0150245 A1    May 31, 2018

(30) Foreign Application Priority Data

Nov. 28, 2016 (KR) .................. 10-2016-0159428

(51) Int. Cl.
| | | |
|---|---|---|
| *G06F 11/10* | (2006.01) | |
| *H03M 13/00* | (2006.01) | |
| *G06F 3/06* | (2006.01) | |
| *G06F 1/28* | (2006.01) | |

(52) U.S. Cl.
CPC ............ *G06F 3/0619* (2013.01); *G06F 3/064* (2013.01); *G06F 3/0653* (2013.01); *G06F 3/0679* (2013.01); *G06F 11/1004* (2013.01); *G06F 1/28* (2013.01)

(58) Field of Classification Search
CPC .. G06F 3/0619; G06F 11/1004; G06F 3/0653; G06F 3/0679; G06F 3/064; G06F 1/28; G06F 3/0616; G06F 3/0644; G06F 3/0659; G06F 3/0665; G06F 12/0246; G06F 2212/1036; G06F 2212/152; G06F 2212/214; G06F 2212/7201; G06F 2212/7206; G06F 2212/7211; G11C 5/143; G11C 16/30; G11C 5/147
See application file for complete search history.

(56) References Cited

U.S. PATENT DOCUMENTS 8,634,267 B2   1/2014 Tam

*Primary Examiner* — Guerrier Merant
(74) *Attorney, Agent, or Firm* — IP & T Group LLP (57) ABSTRACT

A data processing system includes a host device; and a data storage device suitable for detecting a voltage drop state in the voltage received from the host device, changing a first key received from the host device to a second key when detecting the voltage drop state, generating a cyclical redundancy check (CRC) data based on the second key, and transmitting the generated CRC data to the host device.

17 Claims, 9 Drawing Sheets

DATA STORAGE DEVICE AND DATA PROCESSING SYSTEM

CROSS-REFERENCES TO RELATED APPLICATION

The present application claims priority under 35 U.S.C. § 119(a) to Korean application number 10-2016-0159248, filed on Nov. 28, 2016, in the Korean Intellectual Property Office, which is incorporated herein by reference in its entirety.

BACKGROUND

1. Technical Field

Various embodiments generally relate to a data processing system including a data storage device which uses a nonvolatile memory device as a storage medium.

2. Related Art

Recently, the paradigm for the computer environment has been converted into ubiquitous computing so that computer systems can be used anytime and anywhere. Due to this fact, the use of portable electronic devices such as mobile phones, digital cameras, and notebook computers has rapidly increased. In general, such portable electronic devices use a data storage device which uses a memory device. A data storage device is used to store data to be used in a portable electronic device.

A data storage device using a memory device provides advantages in that, since there is no mechanical driving part, stability and durability are excellent, an information access speed is high and power consumption is small. Data storage devices having such advantages include a universal serial bus (USB) memory device, memory cards having various interfaces, a universal flash storage (UFS) device, and a solid state drive (SSD).

SUMMARY

Various embodiments are directed to a data storage device which is able to detect and notify a voltage drop state thereof to a host device by using a cyclical redundancy check scheme, and a host device which is able to perform a recovery operation to the data storage device of the voltage drop state.

In an embodiment, a data processing system may include: a host device; and a data storage device suitable for detecting a voltage drop state in the voltage received from the host device, changing a first key received from the host device to a second key when detecting the voltage drop state, generating a cyclical redundancy check (CRC) data based on the second key, and transmitting the generated CRC data to the host device.

In an embodiment, a data processing system may include: a data storage device; and a host device having a predetermined first key and suitable for transmitting a request and data to the data storage device. The data storage device includes a voltage detector suitable for detecting a voltage drop state of the data storage device and generating a voltage drop signal when the voltage drop state is detected; and a CRC block suitable for generating CRC data for the data by using the first key, and changing the first key to a second key according to the voltage drop signal.

According to the embodiments, since a host device may perform a recovery process for a voltage drop state, the reliability and performance of a data storage device may be improved.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which.

DETAILED DESCRIPTION

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device and a data processing system will be described below with reference to the accompanying drawings through various examples of embodiments.

Figure 1:
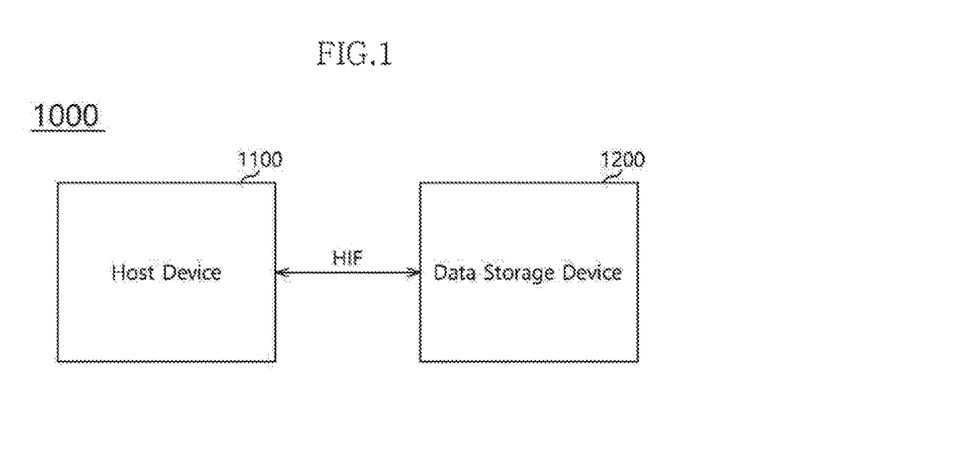
FIG. 1 is a block diagram illustrating a data processing system in, accordance with an embodiment of the present invention.

FIG. 1 is a block diagram illustrating a data processing system 1000, in accordance with an embodiment of the present invention.

The data processing system 1000 may include a host device 1100 operatively coupled to a data storage device 1200. The data storage device 1200 may store data to be accessed by the host device 1100. The host device 1100 may be an electronic device such as a mobile phone, an MP3 player, a laptop computer, a desktop computer, a game player, a TV, an in-vehicle infotainment system, and so forth. The host device 1100 may provide data to the data storage device 1200 for storage and may also access the stored data in the data storage device 1200. The data storage device 1200 may also be referred to as a memory system.

The data storage device 1200 may be constructed as any one among various kinds of storage devices according to a host interface HIF which is coupled with the host device 1100. For example, the data storage device 1200 may be configured as any one of various kinds of storage devices such as a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so forth.

The data storage device 1200 may be manufactured as any one among various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

Figure 2:
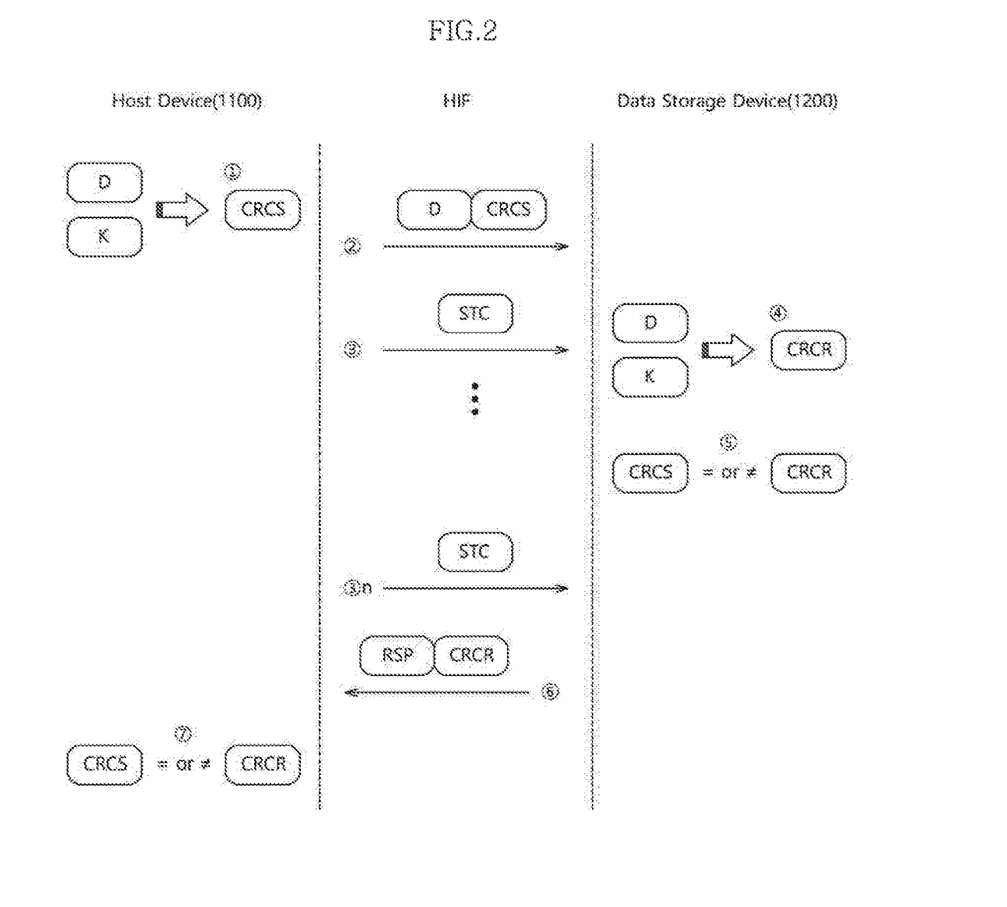
FIG. 2 is a diagram illustrating a cyclical redundancy check scheme, in accordance with an embodiment of the present invention.

FIG. 2 is a diagram illustrating a cyclical redundancy check scheme, in accordance with an embodiment of the present invention. The host device 1100 and the data storage device 1200 may exchange data by using the cyclical redundancy check (CRC) scheme. The host device 1100 may transmit a request to the data storage device 1200 by using the CRC scheme. Also, the data storage device 1200 may respond to the request of the host device 1100 by using the CRC scheme.

For instance, the operation flow of a sender device (e.g., the host device 1100) which transmits data by using the CRC scheme and a receiver device (e.g., the data storage device 1200) which responds to such the sender device is illustrated in FIG. 2.

The host device 1100 may generate CRC data CRCS for data D to be transmitted to the data storage device 1200 based on a key K (process "①" of FIG. 2).

The host device 1100 may transmit the data D together with the CRC data CRCS to the data storage device 1200 (process "②" of FIG. 2).

The host device 1100 may transmit a state check command STC for checking whether the transmitted data D is received normally. The host device 1100 may repeat the transmission of the STC until a response information RSP is received from the data storage device 1200 (processes "③" to "③n" of FIG. 2).

The data storage device 1200 may generate CRC data CRCR for the transmitted data D based on the key K (process "④" of FIG. 2). The same key K may be used by both the data storage device 1200 and the host device 1100. That is to say, the host device 1100 and the data storage device 1200 may respectively generate CRC data by using the same key K. The key K may be determined in advance.

The data storage device 1200 may compare the CRC data CRCS transmitted from the host device 1100 and the CRC data CRCR generated by itself (process "⑤" of FIG. 2). In the case where the CRC data CRCS transmitted from the host device 1100 and the CRC data CRCR generated by itself are the same, the data storage device 1200 may determine that the data D was transmitted normally. Conversely, in the case where the CRC data CRCS transmitted from the host device 1100 and the CRC data CRCR generated by itself are not the same, the data storage device 1200 may determine that the data D was transmitted abnormally.

In response to the state check command STC, the data storage device 1200 may transmit the transmission state of the data D to the host device 1100. In other words, the data storage device 1200 may provide the host device 1100 with the response information RSP together with the CRC data CRCR generated by itself (process "⑥" of FIG. 2). For instance, the response information RSP may include an information on the transmission state of the data D (hereinafter, referred to as a transmission state information). Regardless of whether the data D was transmitted normally or abnormally, the transmission state information indicates whether or not the data D was transmitted. Also, the response information RSP may include an information indicating whether the CRC data CRCR added to the response information RSP is valid or invalid CRC data (hereinafter, referred to as a CRC validity information).

The host device 1100 may compare the CRC data CRCR transmitted from the data storage device 1200 and the CRC data CRCS generated by itself (process "⑦" of FIG. 2). The host device 1100 may perform the comparison operation in the case where the transmitted CRC data CRCR added to the response information RSP is valid. In the case where the CRC data CRCR transmitted from the data storage device 1200 and the CRC data CRCS generated by itself are the same, the host device 1100 may determine that the data D was transmitted normally. Conversely, in the case where the CRC data CRCR transmitted from the data storage device 1200 and the CRC data CRCS generated by itself are not the same, the host device 1100 may determine that the data D was transmitted abnormally. In this case, the host device 1100 may retransmit the data D.

Figure 3:
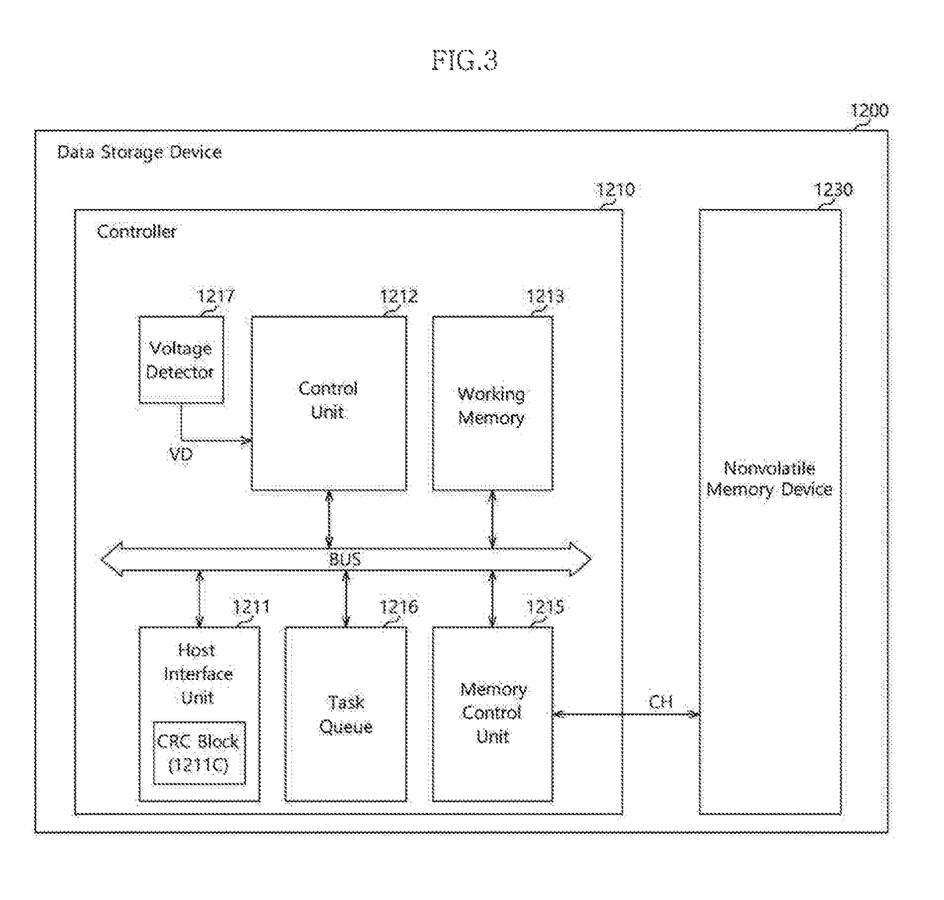
FIG. 3 is a block diagram illustrating a data storage, device in accordance with an embodiment of the present invention.

FIG. 3 is a block diagram illustrating a data storage device, in accordance with an embodiment of the present invention.

The data storage device 1200 may include a controller 1210 operatively coupled to a nonvolatile memory device 1230.

The controller 1210 may include a host interface unit 1211, a control unit 1212, a working memory 1213, a memory control unit 1215, a task queue 1216, and a voltage detector 1217.

The host interface unit 1211 may interface the host device 1100 and the data storage device 1200. For example, the host interface unit 1211 may communicate with the host device 1100 by using the host interface HIF. The host interface HIF may be any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-E) protocols.

The host interface unit 1211 may include a CRC block 1211C. The CRC block 1211C may perform a CRC operation. Namely, as described above with reference to FIG. 2, the CRC block 1211C may generate the CRC data CRCR based on the key K, compare the transmitted CRC data CRCS and the generated CRC data CRCR, and transmit the response information RSP to the host device 1100. The CRC block 1211C may transmit the CRC data CRCR together with the response information RSP.

Further, according to control of the control unit 1212 which recognizes a voltage drop state of the data storage device 1200, the CRC block 1211C may change the key K to an abnormal key, and may newly generate CRC data CRCR based on the abnormal key. The operation of the CRC block 1211C in the voltage drop state will be described later in detail with reference to FIG. 5.

The control unit 1212 may control the general operations of the controller 1210. The control unit 1212 may drive an instruction or an algorithm of a code type, that is, a software, loaded in the working memory 1213, and may control the operations of the internal function blocks of the controller 1210. The control unit 1212 may be constructed by a micro control unit (MCU) or a central processing unit (CPU).

The working memory 1213 may store a software to be driven by the control unit 1212. Also, the working memory 1213 may store the data needed to drive the software. The working memory 1213 may be constructed by a random access memory such as a dynamic random access memory (DRAM) or a static random access memory (SRAM).

The memory control unit 1215 may control the nonvolatile memory device 1230 according to control of the control unit 1212. The memory control unit 1215 may also be referred to as a memory interface unit. The memory control unit 1215 may provide control signals to the nonvolatile memory device 1230. The control signals may include a command, an address, a control signal and so forth for controlling the nonvolatile memory device 1230. The memory control unit 1215 may provide data to the nonvolatile memory device 1230 or may be provided with the data read out from the nonvolatile memory device 1230.

The task queue 1216 may store a task which is generated based on the request transmitted from the host device 1100. The task may mean a work list, a command, or the like, to be performed by the data storage device 1200 or the control unit 1212 to process the request transmitted from the host device 1100. The task queue 1216 may also be referred to as a command queue. The task queue 1216 may be included in the host interface unit 1211.

The voltage detector 1217 may detect the level of the operation voltage of the data storage device 1200 provided from an external device, for example, the host device 1100. The voltage detector 1217 may provide a voltage drop signal VD to the control unit 1212 based on a result of detecting the level of the operation voltage. For example, in the case where the level of the operation voltage provided from the host device 1100 is lower than a reference level, the voltage detector 1217 may provide the voltage drop signal VD to the control unit 1212.

The nonvolatile memory device 1230 may be coupled with the controller 1210 through a channel CH which means a signal line (or signal lines) capable of transmitting a command, an address, control signals and data. The nonvolatile memory device 1230 may be used as the storage medium of the data storage device 1200.

The nonvolatile memory device 1230 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide. The ferroelectric random access memory (FRAM), the magnetic random access memory (MRAM), the phase change random access memory (PCRAM) and the resistive random access memory (RERAM) are examples of nonvolatile random access memory devices capable of random access to memory cells. The nonvolatile memory device 12130 may be configured by a combination of a NAND flash memory device and any one of the above-described various types of nonvolatile random access memory devices.

Figure 4:
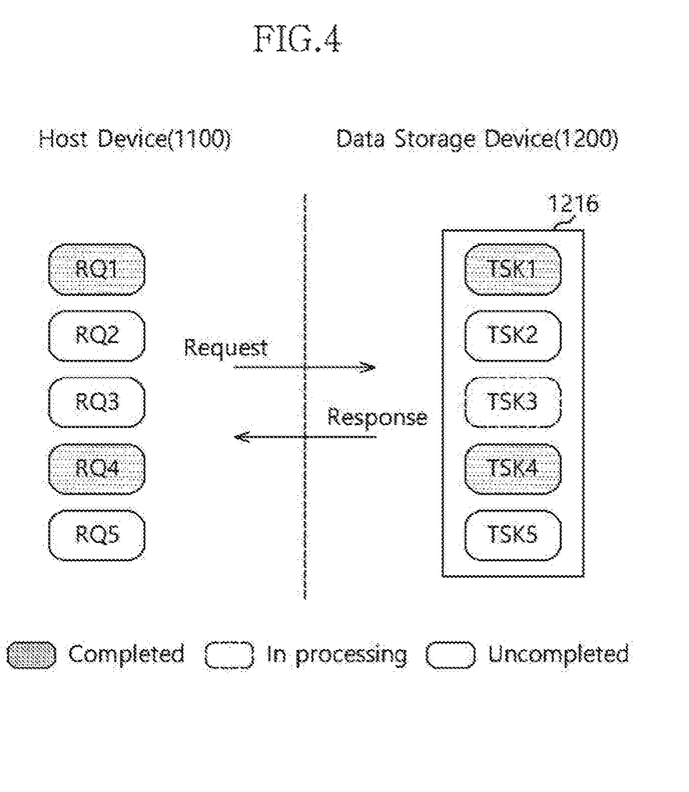
FIG. 4 is a diagram illustrating a host device which transmits a request and a data storage device which transmits a response to the request, in accordance with an embodiment of the present invention.

FIG. 4 is a diagram illustrating the host device 1100 which transmits a request and the data storage device 1200 which transmits a response to the request in accordance with an embodiment of the present invention. As an example, it is assumed that the host device 1100 transmits five requests RQ1 to RQ5 and the data storage device 1200 processes tasks TSK1 to TSK5 respectively corresponding to the requests RQ1 to RQ5 will be exemplified.

The host device 1100 may transmit the requests RQ1 to RQ5 to the data storage device 1200 sequentially or randomly. The host device 1100 may transmit another request regardless of whether a task for a previously transmitted request is completed. In FIG. 4, it is assumed, as an example, that all the requests RQ1 to RQ5 are transmitted sequentially.

The data storage device 1200 may generate the tasks TSK1 to TSK5 respectively based on the transmitted requests RQ1 to RQ5. The generated tasks TSK1 to TSK5 may be stored in the task queue 1216. The data storage device 1200 may process the generated tasks TSK1 to TSK5 sequentially or randomly. The data storage device 1200 may process preferentially a task for a request transmitted earlier, or may process preferentially a task according to a process priority or process preferentially a task requiring a shorter process time.

The data storage device 1200 may provide the host device 1100 with a response indicating completion of a task corresponding to the provided request. For example, referring to FIG. 4, the data storage device 1200 may transmit a response to the host device 1100 for each of the tasks TSK1 and TSK4 notifying the host device 1100 that tasks TSK1 and TSK4 have been completed. For example, when task TSK1 is completed, a response may be transmitted to the host device 1100 notifying the host device 1100 that task TSK1 has been completed. Also, when task TSK4 is completed, a response may be transmitted to the host device 1100 notifying the host device 1100 that task TSK4 has been completed The host device 1100 may recognize, based on the responses of the data storage device 1200, that processing of the tasks TSK1 and TSK4 corresponding to the requests RQ1 and RQ4 have been completed. Also, the host device 1100 may recognize that processing of the tasks TSK2, TSK3, and TSQ5 corresponding to the requests RQ2, RQ3 and RQ5 has not been completed as of yet since corresponding responses have not yet been received from the data storage device 1216. In such a state, if an abnormal state is notified from the data storage device 1200, the host device 1100 may perform a recovery operation for processing the uncompleted tasks TSK2, TSK3 and TSK5 which correspond to the requests RQ2, RQ3 and RQ5, respectively.

Figure 5:
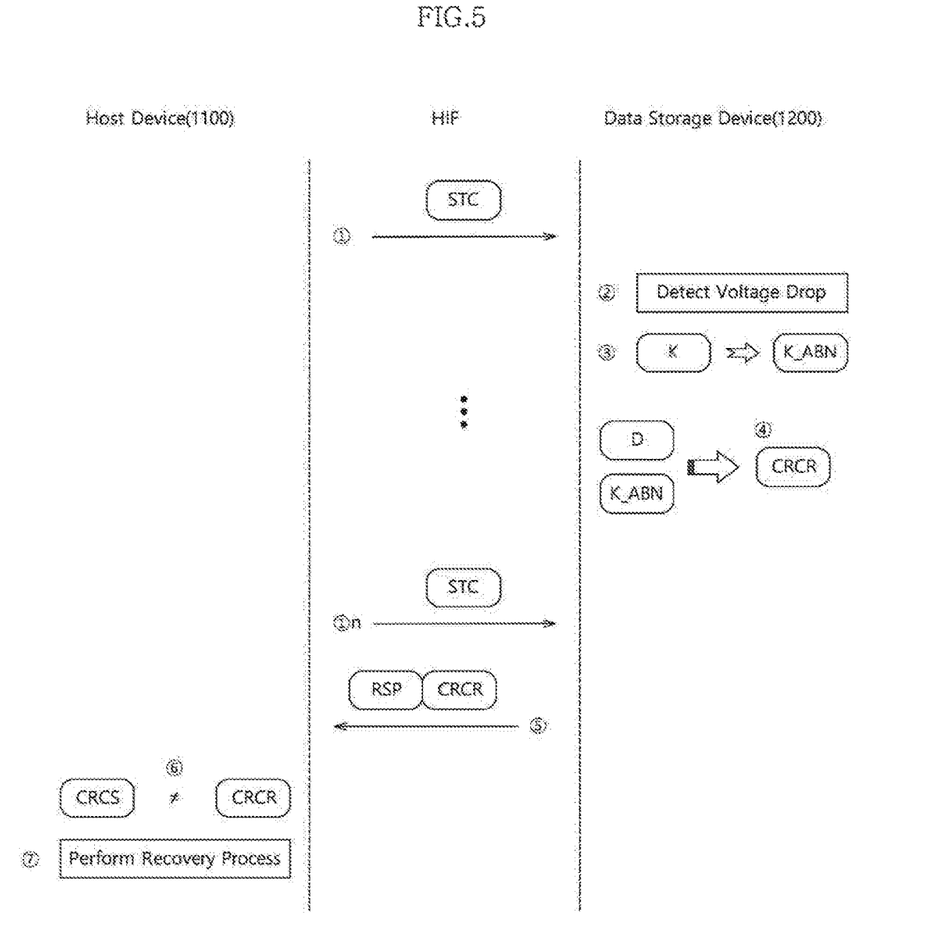
FIG. 5 is a diagram illustrating a host device which is capable of performing a recovery operation to a data storage device of an abnormal state, in accordance with an embodiment of the present invention.

FIG. 5 is a diagram illustrating the host device 1100 which is capable of performing a recovery operation to the data storage device 1200 of an abnormal state in accordance with an embodiment of the present invention. In describing FIG. 5, the data storage device 1200 which processes the tasks TSK1 to TSK5 of FIG. 4 will be exemplified. That is to say, it is assumed that the tasks TSK1 and TSK4 have been completed, the task TSK3 is being processed and the tasks TSK2 and TSK5 are scheduled to be processed.

The host device 1100 may repeatedly transmit the state check command STC for checking whether a task corresponding to a provided request is processed or not until a response RSP is transmitted from the data storage device 1200 (processes "①" to "①n" of FIG. 5).

The data storage device 1200 may detect a voltage drop of the data storage device 1200 (process "②" of FIG. 5). For instance, the control unit 1212 of the data storage device 1200 may recognize a voltage drop state of the data storage device 1200 when the voltage drop signal VD is transmitted from the voltage detector 1217. In this example, it is assumed, that the voltage detector 1217 detects a voltage drop and generates a voltage drop signal VD while the data storage device 1200 is processing the task TSK3.

When a voltage drop state is recognized (process "②" of FIG. 5), the data storage device 1200 may then change the key K used in generating the CRC data (process "③" of FIG. 5). In other words, the control unit 1212 may control the CRC block 1211C of the host interface unit 1211 to change the key K used for the generation of the CRC data. The CRC block 1211C may change the key K, which is determined in advance with the host device 1100, to an abnormal key K_ABN, according to control of the control unit 1212.

The data storage device 1200 may then generate the CRC data CRCR using the abnormal key K_ABN (process "④" of FIG. 5). For instance, the CRC block 1211C may generate the CRC data CRCR for data D corresponding to the currently processed task TSK3 and for the scheduled tasks TSK2 or TSK5 which are scheduled to be processed based on the abnormal key K_ABN. Because the CRC data is generated based on the abnormal key K_ABN which is different from the key K originally predetermined in advance with the host device 1100, the generated CRC data CRCR based on the abnormal key K_ABN will not match the CRC data CRCS which is generated by the host device 1100 for each of the requests RQ3, RQ2 and RQ5 respectively corresponding to the currently processed task TSK3 and the scheduled tasks TSK2 and TSK5. Hence, in order to notify an abnormal state to the host device 1100, the intentionally changed CRC data CRCR are generated.

The data storage device 1200 may provide the host device 1100 with the response information RSP together with the CRC data CRCR generated by itself in response to the state check command STC transmitted repeatedly (process "⑤" of FIG. 5) until a response RSP is received from the data storage device 1200 corresponding to the state check command request STC. For instance, the response information RSP may include a processing state information indicating completion of a task corresponding to the provided request. Also, the response information RSP may include the CRC validity information.

The host device 1100 may compare the CRC data CRCR transmitted from the data storage device 1200 and the CRC data CRCS generated by itself, and determine that the CRC data CRCS and CRCR are different from each other when the transmitted CRC data CRCR added to the response information RSP is valid (process "⑥" of FIG. 5). That is to say, in the case where the CRC data CRCR transmitted from the data storage device 1200 and the CRC data CRCS generated by itself are not the same, and the processing state information is provided from the data storage device 1200, the host device 1100 may determine that the data storage device 1200 is an abnormal state (for example, a voltage drop state).

When it is determined that the data storage device 1200 is an abnormal state, the host device 1100 may perform a recovery operation (process "⑦" of FIG. 5). For instance, the host device 1100 may initialize the data storage device 1200 by providing an initialization command or an initialization signal. After the data storage device 1200 is initialized, the host device 1100 may retransmit requests corresponding to the uncompleted tasks (that is, the requests RQ2, RQ3 and RQ5 respectively corresponding to the uncompleted tasks TSK2, TSK3 and TSK5). As to the requests corresponding to the uncompleted tasks, the processing state information is not yet transmitted from the data storage device 1200.

In this way, the data storage device 1200 may notify an abnormal state (for example, a voltage drop state) to the host device 1100 by using a CRC scheme. Also, the host device 1100 may perform a recovery operation to the data storage device 1200 of the abnormal state.

Figure 6:
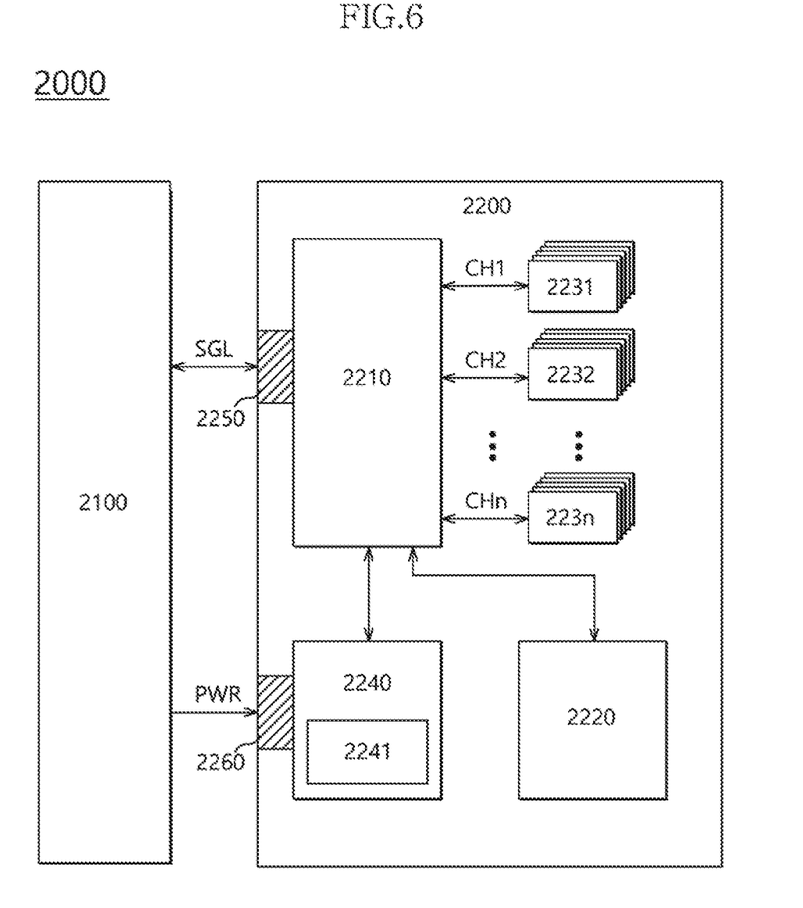
FIG. 6 is a diagram illustrating a data processing system including a solid state drive (SSD), in accordance with an embodiment of the present invention.

FIG. 6 is a diagram illustrating a data processing system 2000 including a solid state drive (SSD) 2200 in accordance with an embodiment of the present invention. Referring to FIG. 6, the data processing system 2000 may include a host device 2100 operatively coupled to the SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control the general operations of the SSD 2200.

The buffer memory device 2220 may temporarily store data to be stored in the nonvolatile memory devices 2231 to 223n. Further, the buffer memory device 2220 may temporarily store data read out from the nonvolatile memory devices 2231 to 223n. The data temporarily stored in the buffer memory device 2220 may be transmitted to the host device 2100 or the nonvolatile memory devices 2231 to 223n according to control of the controller 2210.

The nonvolatile memory devices 2231 to 223n may be used as storage media of the SSD 2200. The nonvolatile memory devices 2231 to 223n may be coupled with the controller 2210 through a plurality of channels CH1 to CHn, respectively. One or more nonvolatile memory devices may be coupled to one channel. The nonvolatile memory devices coupled to each channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power to allow the SSD 2200 to be normally terminated when a sudden power-off occurs. The auxiliary power supply 2241 may include large capacitance capacitors capable of charging power PWR.

The controller 2210 may exchange a signal SGL with the host device 2100 through the signal connector 2250. The signal SGL may include a command, an address, data, and so forth. The signal connector 2250 may be constructed by various types of connectors depending on an interface scheme between the host device 2100 and the SSD 2200.

Figure 7:
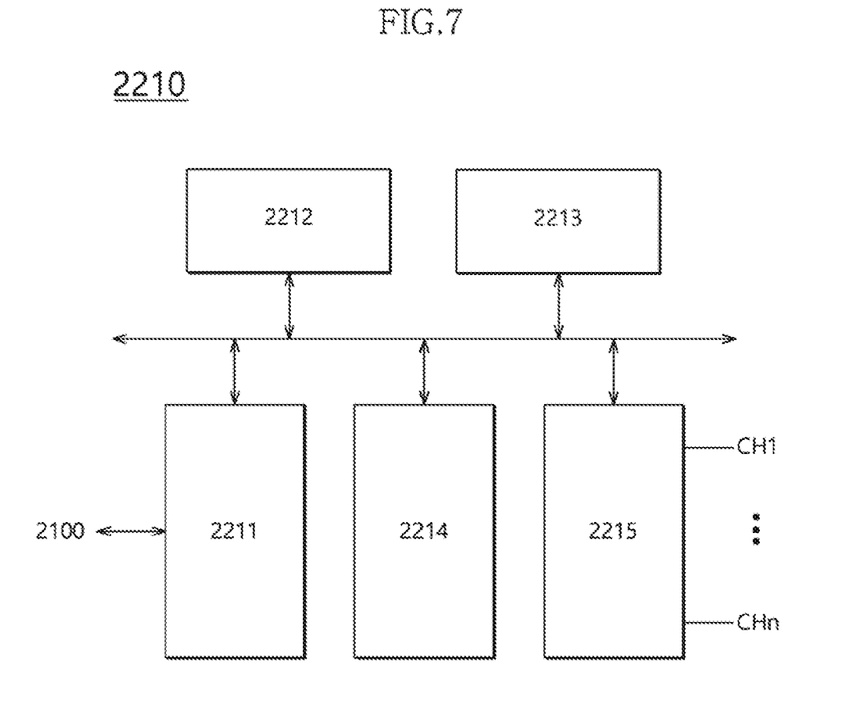
FIG. 7 is a diagram illustrating an exemplary configuration of a controller shown in FIG. 6.

FIG. 7 is a diagram illustrating an exemplary configuration of the controller 2210 shown in FIG. 6. Referring to FIG. 7, the controller 2210 may include a host interface unit 2211, a control unit 2212, a random access memory 2213, an error correction code (ECC) unit 2214, and a memory interface unit 2215.

The host interface unit 2211 may interface the host device 2100 and the SSD 2200 according to the protocol of the host device 2100. For example, the host interface unit 2211 may communicate with the host device 2100 through any one of secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E) and universal flash storage (UFS) protocols. In addition, the host interface unit 2211 may perform a disk emulating function for supporting the host device 2100 to recognize the SSD 2200 as a general purpose data storage device, for example, a hard disk drive (HDD).

The control unit 2212 may analyze and process the signal SGL inputted from the host device 2100. The control unit 2212 may control operations of internal function blocks according to a firmware or a software for driving the SSD 2200. The random access memory 2213 may be used as a working memory for driving such a firmware or software.

The error correction code (ECC) unit 2214 may generate the parity data of data to be transmitted to the nonvolatile memory devices 2231 to 223n. The generated parity data may be stored, along with data, in the nonvolatile memory devices 2231 to 223n. The error correction code (ECC) unit 2214 may detect an error of the data read out from the nonvolatile memory devices 2231 to 223n, based on parity data. If a detected error is within a correctable range, the error correction code (ECC) unit 2214 may correct the detected error.

The memory interface unit 2215 may provide control signals such as commands and addresses to the nonvolatile memory devices 2231 to 223n, according to control of the control unit 2212. Moreover, the memory interface unit 2215 may exchange data with the nonvolatile memory devices 2231 to 223n, according to control of the control unit 2212. For example, the memory interface unit 2215 may provide the data stored in the buffer memory device 2220, to the nonvolatile memory devices 2231 to 223n, or provide the data read out from the nonvolatile memory devices 2231 to 223n, to the buffer memory device 2220.

Figure 8:
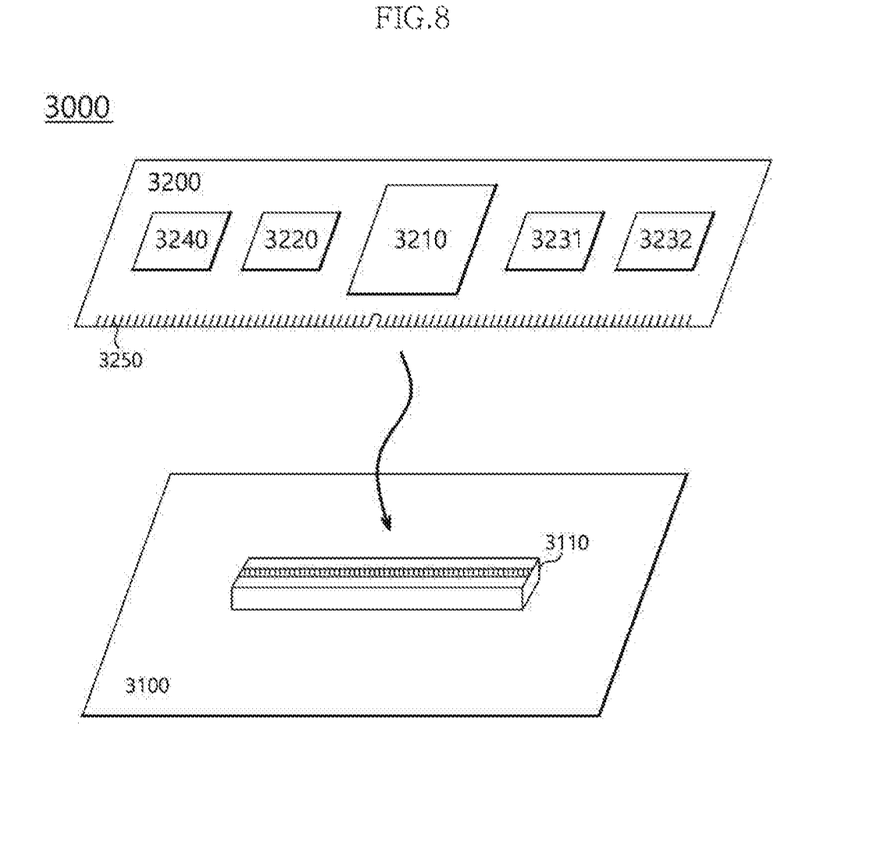
FIG. 8 is a diagram illustrating a data processing system including a data storage device, in accordance with an embodiment of the present invention.

FIG. 8 is a diagram illustrating a data processing system 3000 including a data storage device 3200 in accordance with an embodiment of the present invention. Referring to FIG. 8, the data processing system 3000 may include a host device 3100 operatively coupled to the data storage device 3200.

The host device 3100 may be constructed in the form of a board such as a printed circuit board. Although not shown, the host device 3100 may include internal function blocks for performing the function of a host device.

The host device 3100 may include a connection terminal 3110 such as a socket, a slot or a connector. The data storage device 3200 may be mounted to the connection terminal 3110.

The data storage device 3200 may be constructed in the form of a board such as a printed circuit board. The data storage device 3200 may be referred to as a memory module or a memory card. The data storage device 3200 may include a controller 3210, a buffer memory device 3220, nonvolatile memory devices 3231 and 3232, a power management integrated circuit (PMIC) 3240, and a connection terminal 3250.

The controller 3210 may control the general operations of the data storage device 3200. The controller 3210 may be configured in the same manner as the controller 2210 shown in FIG. 6.

The buffer memory device 3220 may temporarily store data to be stored in the nonvolatile memory devices 3231 and 3232. Further, the buffer memory device 3220 may temporarily store the data read out from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the data storage device 3200.

The PMIC 3240 may provide the power inputted through the connection terminal 3250, to the inside of the data storage device 3200. The PMIC 3240 may manage the power of the data storage device 3200 according to control of the controller 3210.

The connection terminal 3250 may be coupled to the connection terminal 3110 of the host device 3100. Through the connection terminal 3250, signals such as commands, addresses, data and so forth and power may be transferred between the host device 3100 and the data storage device 3200. The connection terminal 3250 may be constructed into various types depending on an interface scheme between the host device 3100 and the data storage device 3200. The connection terminal 3250 may be disposed on any one side of the data storage device 3200.

Figure 9:
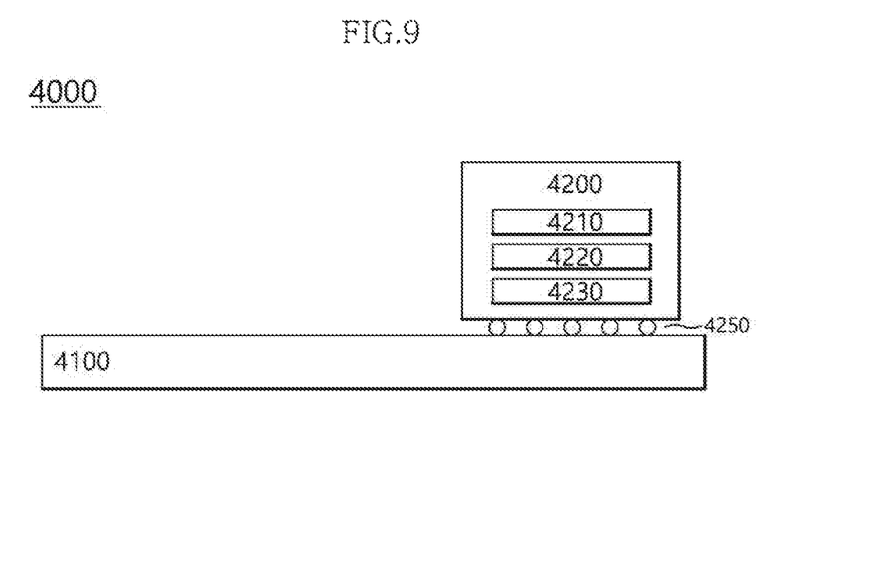
FIG. 9 is a diagram illustrating a data processing system including a data storage device, in accordance with another embodiment of the present invention.

FIG. 9 is a diagram illustrating a data processing system 4000 including a data storage device 4200 in accordance with an embodiment of the present invention. Referring to FIG. 9, the data processing system 4000 may include a host device 4100 operatively coupled to the data storage device 4200.

The host device 4100 may be constructed in the form of a board such as a printed circuit board. Although not shown, the host device 4100 may include internal function blocks for performing the function of a host device.

The data storage device 4200 may be constructed in the form of a surface-mounting type package. The data storage device 4200 may be mounted to the host device 4100 through solder balls 4250. The data storage device 4200 may include a controller 4210, a buffer memory device 4220, and a nonvolatile memory device 4230.

The controller 4210 may control general operations of the data storage device 4200. The controller 4210 may be configured in the same manner as the controller 2210 shown in FIG. 6.

The buffer memory device 4220 may temporarily store data to be stored in the nonvolatile memory device 4230. Further, the buffer memory device 4220 may temporarily store the data read out from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the data storage device 4200.

Figure 10:
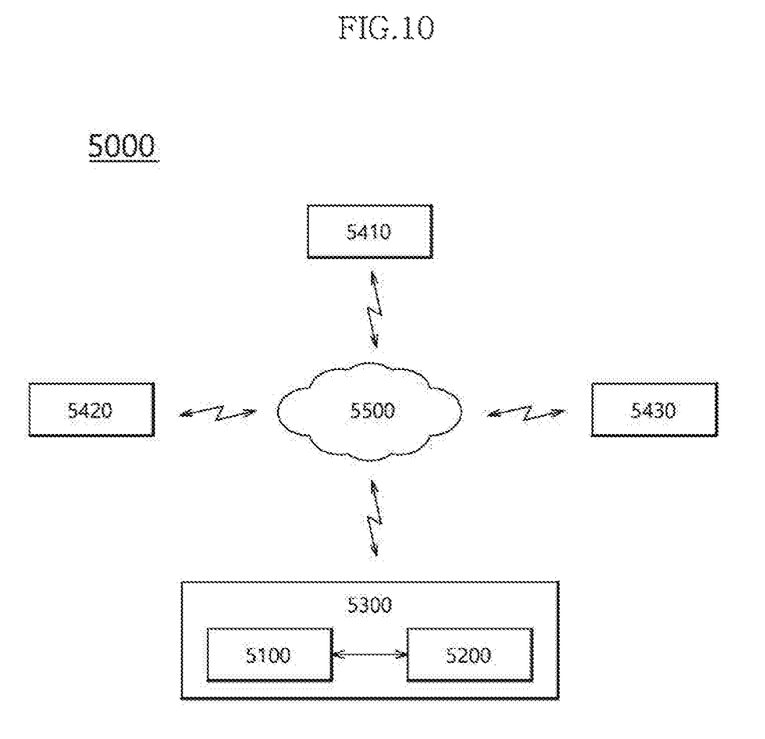
FIG. 10 is a diagram illustrating a network system including a data storage device, in accordance with yet another embodiment of the present invention.

FIG. 10 is a diagram illustrating a network system 5000 including a data storage device 5200 in accordance with an embodiment of the present invention. Referring to FIG. 10, a network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and a data storage device 5200. The data storage device 5200 may be constructed by the data storage device 1200 shown in FIG. 1, the data storage device 2200 shown in FIG. 6, the data storage device 3200 shown in FIG. 8 or the data storage device 4200 shown in FIG. 9.

Figure 11:
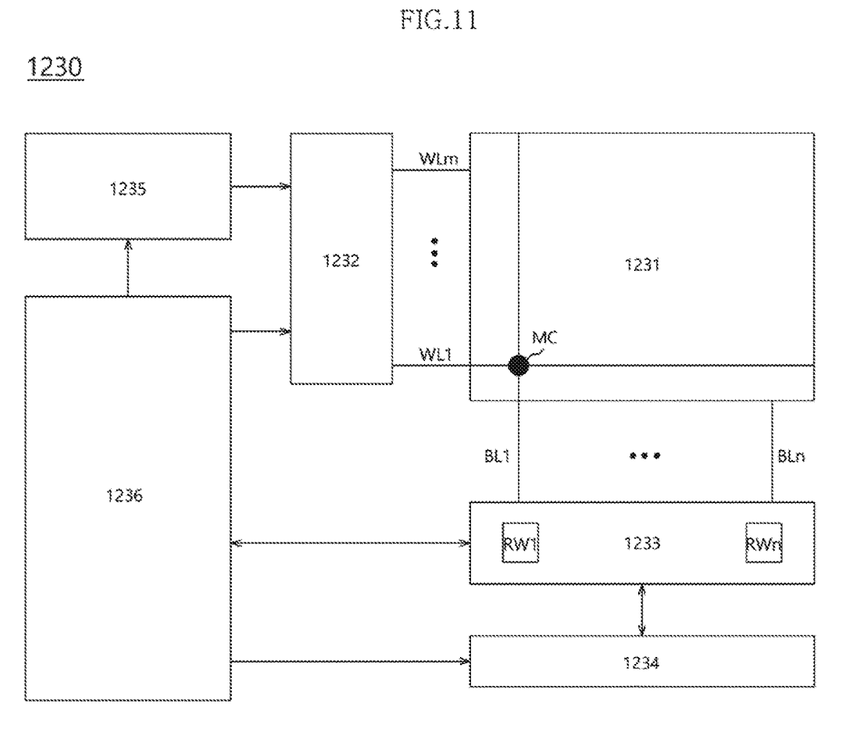
FIG. 11 is a block diagram illustrating a nonvolatile memory device included in a data storage device, in accordance with an embodiment of the present invention.

FIG. 11 is a block diagram illustrating an exemplary configuration of a nonvolatile memory device included in a data storage device in accordance with an embodiment of the present invention. Referring to FIG. 11, a nonvolatile memory device 1230 may include a memory cell array 1231, a row decoder 1232, a column decoder 1233, a data read/write block 1234, a voltage generator 1235, and a control logic 1236.

The memory cell array 1231 may include memory cells MC which are arranged at areas where word lines WL1 to WLm and bit lines BL1 to BLn intersect with each other.

The row decoder 1232 may be coupled with the memory cell array 1231 through the word lines WL1 to WLm. The row decoder 1232 may operate according to control of the control logic 1236. The row decoder 1232 may decode an address provided from an external device (not shown). The row decoder 1232 may select and drive the word lines WL1 to WLm, based on a decoding result. For instance, the row decoder 1232 may provide a word line voltage provided from the voltage generator 1235, to the word lines WL1 to WLm.

The data read/write block 1234 may be coupled with the memory cell array 1231 through the bit lines BL1 to BLn. The data read/write block 1234 may include read/write circuits RW1 to RWn respectively corresponding to the bit lines BL1 to BLn. The data read/write block 1234 may operate according to control of the control logic 1236. The data read/write block 1234 may operate as a write driver or a sense amplifier according to an operation mode. For example, the data read/write block 1234 may operate as a write driver which stores data provided from the external device, in the memory cell array 1231 in a write operation. For another example, the data read/write block 1234 may operate as a sense amplifier which reads out data from the memory cell array 1231 in a read operation.

The column decoder 1233 may operate according to control of the control logic 1236. The column decoder 1233 may decode an address provided from the external device. The column decoder 1233 may couple the read/write circuits RW1 to RWn of the data read/write block 1234 respectively corresponding to the bit lines BL1 to BLn with data input/output lines (or data input/output buffers), based on a decoding result.

The voltage generator 1235 may generate voltages to be used in internal operations of the nonvolatile memory device 1230. The voltages generated by the voltage generator 1235 may be applied to the memory cells of the memory cell array 1231. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 1236 may control general operations of the nonvolatile memory device 1230, based on control signals provided from the external device. For example, the control logic 1236 may control operations of the nonvolatile memory device 1230 such as read, write and erase operations of the nonvolatile memory device 1230.

While various embodiments have been described above, it will be understood to those skilled in the art that the embodiments described are examples only. Accordingly, the data storage device and the data processing system described herein should not be limited based on the described embodiments. Many other embodiments and variations thereof may be envisaged by those skilled in the art to which the present invention pertains without departing from the spirit and scope of the present invention as defined by the following claims.

What is claimed is:

1. A data processing system comprising:
   a host device; and
   a data storage device suitable for:
   detecting a voltage drop state in a voltage received from the host device, changing a first key received from the host device to a second key when detecting the voltage drop state, generating a cyclical redundancy check (CRC) data based on the second key, and transmitting the generated CRC data to the host device.

2. The data processing system according to claim 1, wherein the host device initializes the data storage device based on the CRC data.

3. The data processing system according to claim 2, wherein the host device provides an initialization command to the data storage device for the initialization of the data storage device.

4. The data processing system according to claim 2, wherein the host device retransmits to the data storage device, after the data storage device is initialized, a request corresponding to an uncompleted task for which the host device did not receive a completion notice from the data storage device.

5. The data processing system according to claim 1, wherein the data storage device comprises:
   a control unit;
   a voltage detector suitable for detecting the voltage drop state when the voltage received form the host is less than a reference value, generating a voltage drop signal when the voltage drop state is detected, and transmitting the voltage drop signal to the control unit; and a CRC block suitable for changing the first key to the second key according to the voltage drop signal under the control of the control unit.

6. The data processing system according to claim 5, wherein the CRC block further generates the CRC data for data corresponding to an uncompleted task at the time of the voltage drop state.

7. The data processing system according to claim 1, further comprising a task queue for storing a task which is generated by the data storage device based on a request received from the host device.

8. The data processing system according to claim 7, wherein the task may be a work list, a command, or the like, to be performed by the data storage device or the control unit to process the request transmitted from the host device.

9. The data processing system according to claim 7, wherein the data storage device transmits a response to the host device when the task is completed.

10. The data processing system according to claim 7, wherein when a voltage drop state is notified to the host device from the data storage device, the host device performs a recovery operation for any uncompleted task generated by the data storage device in response to a request received from the host device.

11. A data processing system comprising:
a data storage device; and
a host device having a predetermined first key and suitable for transmitting a request and data to the data storage device,
the data storage device comprising:
a voltage detector suitable for detecting a voltage drop state of the data storage device and generating a voltage drop signal when the voltage drop state is detected; and
a CRC block suitable for generating CRC data for the data by using the first key, and changing the first key to a second key according to the voltage drop signal.

12. The data processing system according to claim 11, wherein the host device provides the data storage device with a state check command for checking whether the request is processed, and
wherein the CRC block generates the CRC data for the data by using the second key in response to the state check command, and transmits the CRC data to the host device.

13. The data processing system according to claim 12, wherein the host device performs a recovery operation to the data storage device in response to the CRC data generated on the basis of the second key.

14. The data processing system according to claim 13, wherein the host device initializes the data storage device while performing the recovery process.

15. The data processing system according to claim 14, wherein the host device provides an initialization command to the data storage device for the initialization of the data storage device.

16. The data processing system according to claim 13, wherein the host device retransmits, after the data storage device is initialized, a request corresponding to an uncompleted task of the data storage device.

17. The data processing system according to claim 11, wherein the data storage device includes a nonvolatile memory device as a storage medium.

* * * * *